United States Patent
Haddad, Jr.

(10) Patent No.: US 6,273,490 B1
(45) Date of Patent: Aug. 14, 2001

(54) REINFORCED PIVOT ARM FOR TRUCK COVERS

(75) Inventor: Edward N. Haddad, Jr., Worcester, MA (US)

(73) Assignee: Pioneer Consolidated Corporation, North Oxford, MA (US)

( * ) Notice: Subject to any disclaimer, the term of this patent is extended or adjusted under 35 U.S.C. 154(b) by 0 days.

(21) Appl. No.: 09/256,888

(22) Filed: Feb. 24, 1999

Related U.S. Application Data

(60) Provisional application No. 60/075,842, filed on Feb. 24, 1998.

(51) Int. Cl.$^7$ .................................................. B60J 11/00
(52) U.S. Cl. .......................... 296/100.01; 296/98; 160/52
(58) Field of Search .................................. 296/98; 160/52

(56) References Cited

U.S. PATENT DOCUMENTS

| | | | |
|---|---|---|---|
| 3,515,428 | * 6/1970 | Killion | 296/98 |
| 3,549,197 | * 12/1970 | Sibley | 296/98 |
| 3,549,198 | * 12/1970 | Cappello | 296/98 |
| 3,549,199 | * 12/1970 | Sibley | 296/98 |
| 3,628,826 | * 12/1971 | Sibley | 296/98 |
| 3,854,770 | * 12/1974 | Grise et al. | 296/98 |
| 3,868,142 | * 2/1975 | Bachand et al. | 296/98 |
| 3,975,047 | 8/1976 | McClellan | 296/100 |
| 4,050,734 | 9/1977 | Richard | 296/98 |
| 4,067,362 | 1/1978 | Jackman | 138/173 |
| 4,082,347 | * 4/1978 | Petretti | 296/98 |
| 4,083,596 | 4/1978 | Robertson | 296/100 |
| 4,126,351 | * 11/1978 | Peteretti | 296/98 |
| 4,299,106 | 11/1981 | Hague | 72/78 |
| 4,341,416 | 7/1982 | Richard | 296/98 |
| 4,342,480 | 8/1982 | Ross, Jr. | 296/100 |
| 4,516,802 | * 5/1985 | Compton | 296/98 |
| 4,627,658 | 12/1986 | Vold et al. | 296/100 |
| 4,673,208 | * 6/1987 | Tsukamoto | 296/98 |
| 4,893,864 | * 1/1990 | Bailey | 296/98 |
| 5,002,329 | 3/1991 | Rafi-Zadeh | 296/100 |
| 5,031,955 | * 7/1991 | Searfoss | 296/98 |
| 5,058,956 | * 10/1991 | Godwin | 296/98 |
| 5,121,949 | 6/1992 | Reese | 285/255 |
| 5,129,698 | * 7/1992 | Cohrs et al. | 296/98 |
| 5,161,851 | 11/1992 | Rafi-Zadeh | 296/100 |
| 5,275,459 | * 1/1994 | Haddad | 296/98 |
| 5,280,965 | 1/1994 | Schwarz | 285/53 |
| 5,292,169 | * 3/1994 | O'Brian | 296/98 |
| 5,328,228 | 7/1994 | Klassen | 296/98 |
| 5,433,501 | 7/1995 | Thomas et al. | 296/191 |
| 5,482,347 | * 1/1996 | Clarys et al. | 296/98 |
| 5,829,818 | * 11/1998 | O'Daniel | 296/98 |
| 5,887,937 | * 3/1999 | Searfoss | 296/98 |
| 5,944,374 | * 8/1999 | Searfoss | 296/98 |

* cited by examiner

Primary Examiner—Joseph D. Pape
Assistant Examiner—Kiran B. Patel
(74) Attorney, Agent, or Firm—Weingarten, Schurgin, Gagnebin & Hayes LLP

(57) ABSTRACT

An apparatus is provided for drawing a flexible cover over an upwardly open container body having an upper edge. The apparatus includes a flexible cover of a size to substantially cover the open container body and fixed at one end of the container body by a cover support for retraction and extension over the open container body. A pair of arms is each pivotally mounted at a fixed end to the container body. Each arm has a free end opposite the fixed end attached to an edge of the flexible cover and configured such that movement of the arms causes movement of the cover over the open container body. Each arm has a hollow, longitudinally extending, tabular member having at least one and preferably two stiffening fins extending longitudinally along substantially the length of the tubular member. The fins are integrally formed with and attached to the tubular member, preferably as an extrusion of an aluminum material to form a single, unitary body.

8 Claims, 6 Drawing Sheets

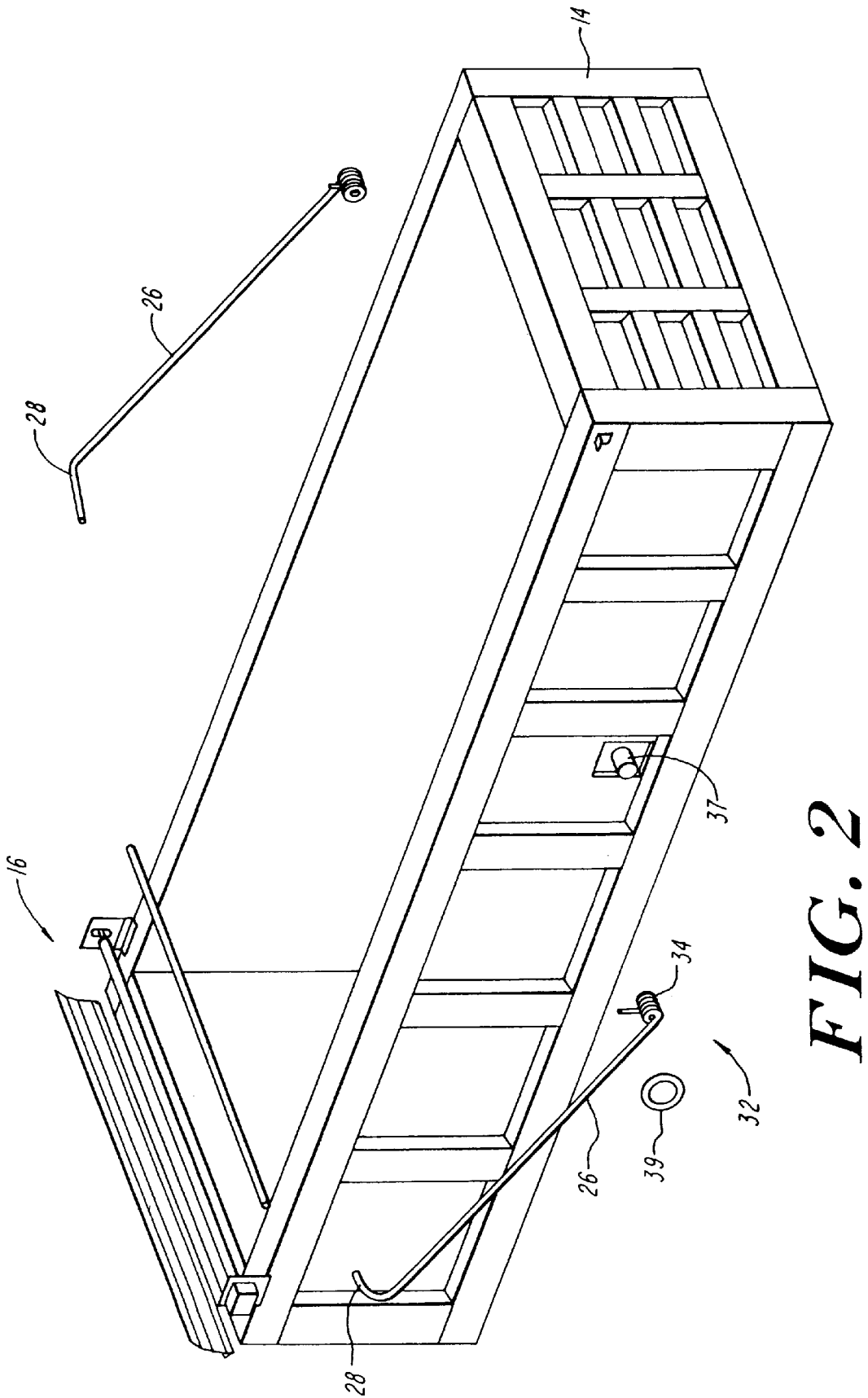

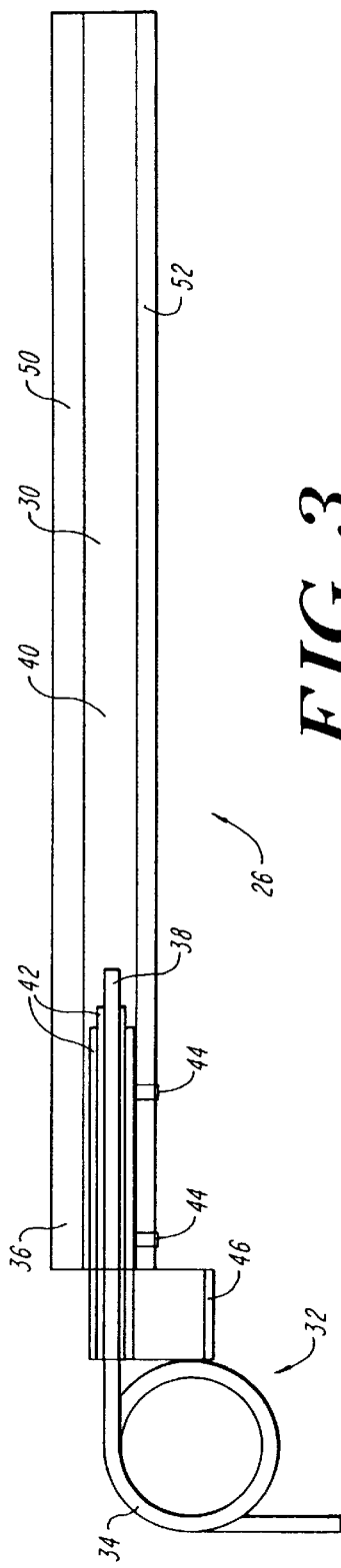
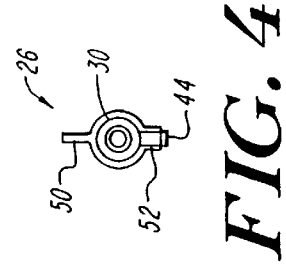
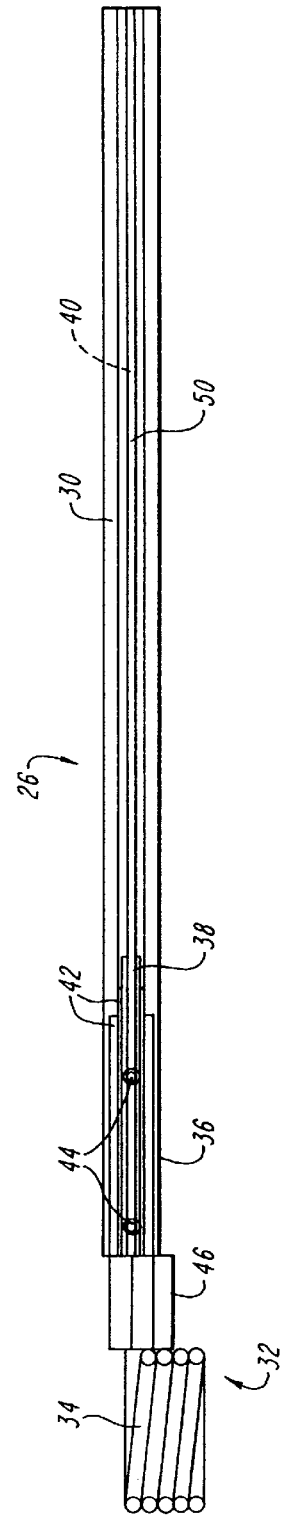

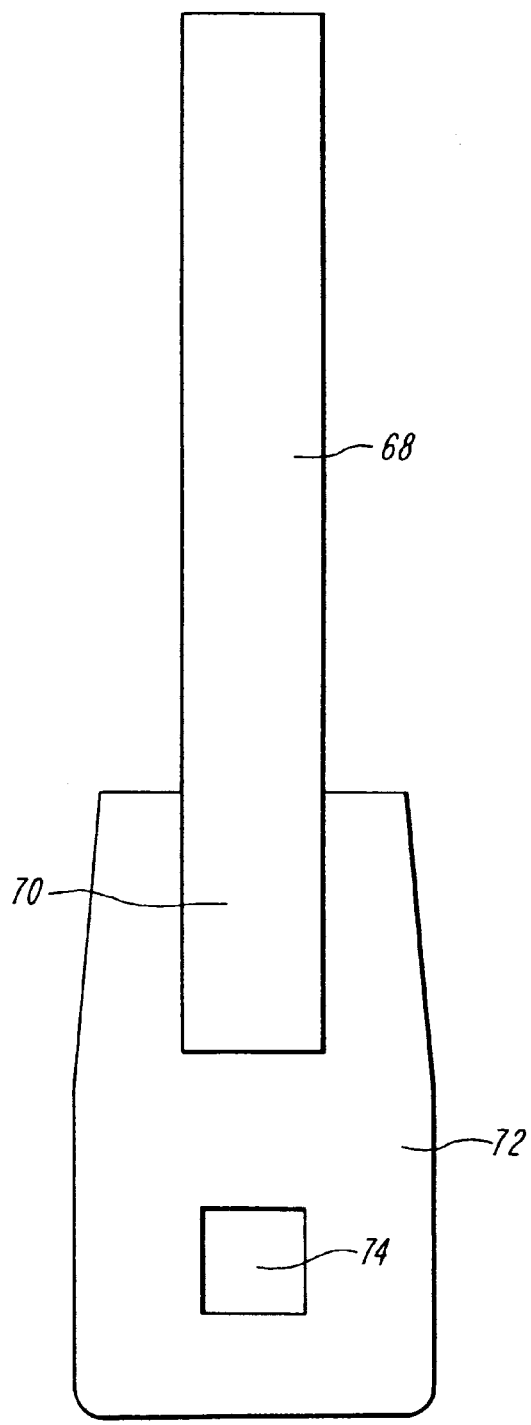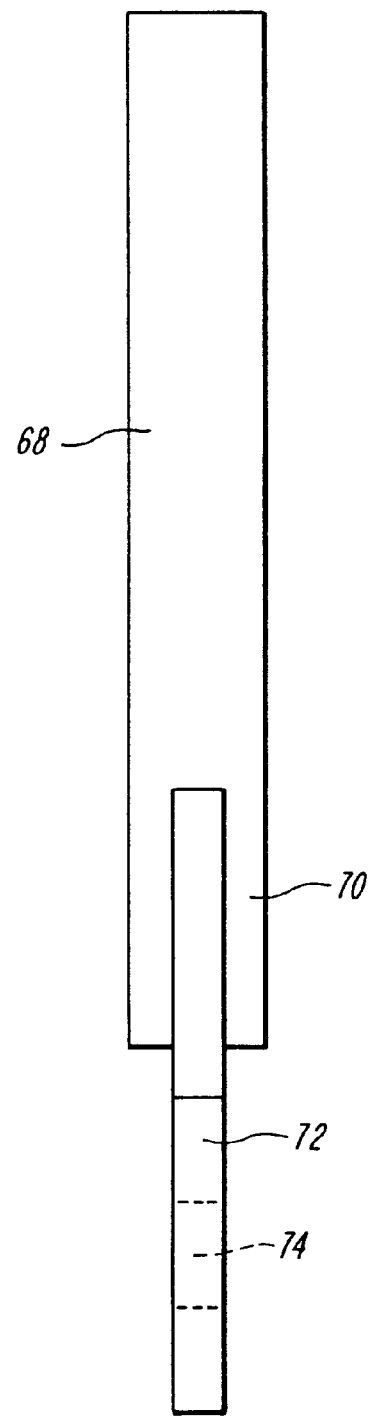
*FIG.8*  *FIG.9*

REINFORCED PIVOT ARM FOR TRUCK COVERS

CROSS REFERENCE TO RELATED APPLICATIONS

This application claims the benefit under 35 U.S.C. § 119(e) of U.S. Provisional Patent Application No. 60/075,842, filed on Feb. 24, 1998, the disclosure of which is incorporated by reference herein.

STATEMENT REGARDING FEDERALLY SPONSORED RESEARCH OR DEVELOPMENT

N/A

BACKGROUND OF THE INVENTION

Truck cover assemblies are used to prevent material from escaping from open truck bodies, such as dump trucks or trucks carrying roll-off containers. Generally, these assemblies comprise a pair of tubular arms, which are pivotally attached at their lower ends to a frame of the truck body. An edge of a cover or tarp is attached to the upper ends of the arms. As the arms are pivoted from the front toward the rear of the truck, they draw the cover over the truck body.

Such tubular pivot arms are liable to bend and deflect, particularly on trucks and trailers over 19 feet in length. If the arms on either side of the truck or trailer do not bend and deflect by the same amount, the cover may roll or unroll unevenly, which may lead to premature tarp wear and ineffective covering and uncovering. This problem has been addressed by adding reinforcement to the arms by way of angle irons or vertical steel strips. However, angle irons make the arms excessively heavy. In particular, for pivoting mechanisms, which include a torsion spring mechanism for biasing the arm, the angle irons increase the stress on the spring mechanism, often to the point where performance of the spring mechanism becomes compromised. Additionally, adding a vertical strip of steel to the arms has a tendency to bow or twist the tubing from the heat of the welding process. This bow and/or twist is aesthetically unpleasant.

BRIEF SUMMARY OF THE INVENTION

The present invention provides a reinforced pivot arm having integral fins or flanges along its length. The resulting pivot arm is stronger and has a straighter one-piece profile. The arm is much lighter than prior art arms with welded angle irons, which allows the spring mechanism to operate within its normal limits.

More particularly, the invention provides an apparatus for drawing a flexible cover over an upwardly open container body having an upper edge. The apparatus comprises a flexible cover of a size to substantially cover the open container body and fixed at one end of the container body by a cover support for retraction and extension over the open container body. A pair of arms is each pivotally mounted at a fixed end to the container body. Each has a free end opposite the fixed end attached to an edge of the flexible cover and configures such that movement of the arms causes movement of the cover over the open container body. Each arm further comprises a hollow, longitudinally extending, tubular member having at least one stiffening fin extending longitudinally along substantially the length of the tubular member. The fin is integrally formed with and attached to the tubular member. Preferably, each arm further includes a second stiffening fin extending longitudinally along substantially the length of the tubular member, the second fin integrally formed with and attached to the tubular member and located on an opposite side of the tubular member from the first fin. In the preferred embodiment, the tubular member and fins are formed as a single extrusion from an aluminum material.

BRIEF DESCRIPTION OF THE SEVERAL VIEWS OF THE DRAWING

The invention will be more fully understood from the following detailed description taken in conjunction with the accompanying drawings in which:

FIG. 2 is an isometric exploded view of the pivot arm and container body of FIG. 1;

FIG. 3 is a front view of a pivot arm of the present invention with a spring mechanism;

FIG. 4 is an end view of the pivot arm of FIG. 2;

FIG. 5 is a side view of the pivot arm of FIG. 2;

FIG. 8 is a front view of a torsion spring assembly according to a further embodiment of the present invention;

FIG. 9 is a side view of the torsion spring assembly of FIG. 8;

DETAILED DESCRIPTION OF THE INVENTION

Figure 1:
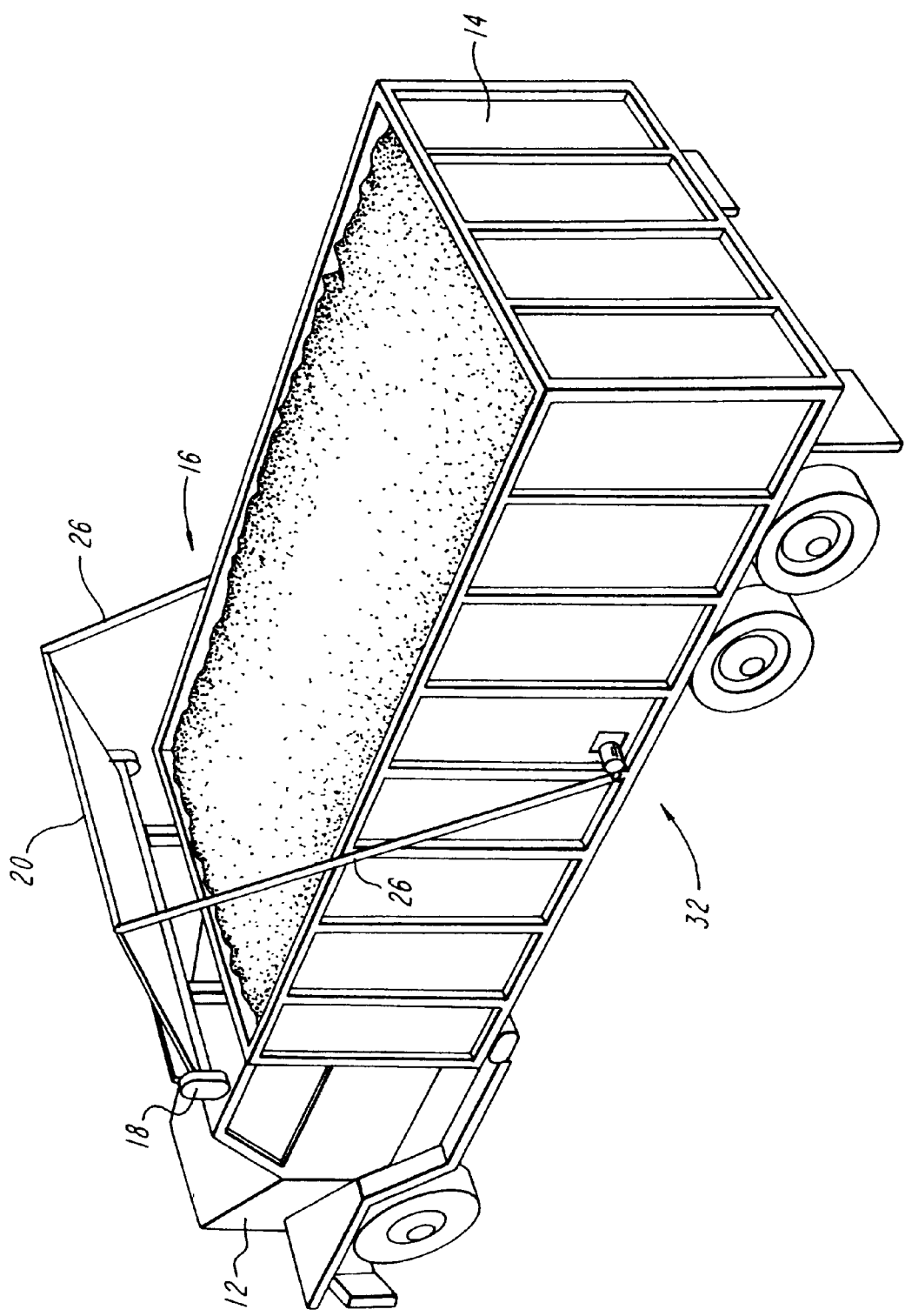
FIG. 1 is an isometric view of a truck incorporating the pivot arm of the present invention.

FIG. 1 illustrates a truck 12 having an upwardly open truck body, trailer, or roll-off container 14, which is coverable by a cover mechanism 16. The cover mechanism includes a cover housing 18 and a flexible cover 20, of sufficient size to cover the open body 14 in a fully extended position. The cover 20 is contained within the cover housing 18 in, for example, a rolled condition when the cover is retracted.

A pair of tubular arms 26 is pivotally mounted, one arm on each side of the truck, to the container 14 by a torsion spring mechanism 32. Upper ends 28 of the pivotable arms are attached to the free end of the truck cover 20 to pull the cover over the body. Typically, the arms have a circular cross-section, best seen in FIGS. 3 and 5. Other cross-sectional configurations, such as elliptical, may be used if desired, however. The pivotable arms 26 may include a telescopable extension at the upper end thereof, if desired, although this is not necessary for operation of the present invention.

Figure 6:
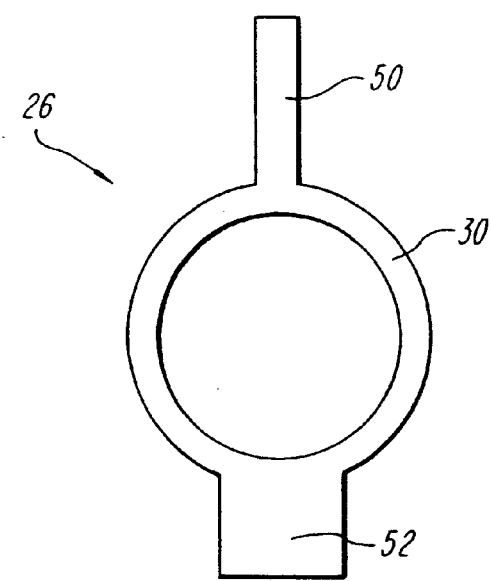
FIG. 6 is an end view of the pivot arm of FIG. 2 with the spring mechanism removed.
Figure 7:
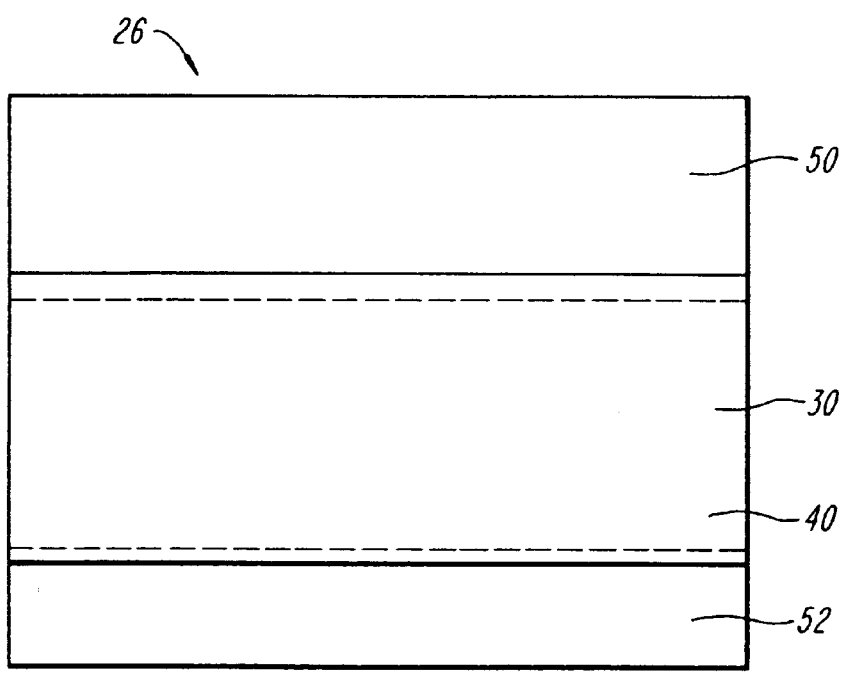
FIG. 7 is a partial side view of the pivot arm of FIG. 5.

As indicated in FIGS. 2, 3, and 6, each arm includes a hollow, longitudinally extending tubular member 30. Referring to FIGS. 3 through 5, the pivotable arms are biased into either the fully closed or the fully open position, as desired, by a torsion spring mechanism 32 having a torsion spring 34, which is fixed to a lower end 36 of each tubular member. The arm may be pivoted against the biasing force of the torsion spring by any suitable actuating mechanism, such as a hydraulic actuator (not shown), as is known in the art.

The torsion spring is fixed at one end to the open body 14, for example, with a bracket 37. The spring may be retained on the bracket by a retaining ring 39, best shown in FIG. 2, The torsion spring mechanism includes a portion 38 of the spring that extends into the hollow interior 40 of the tubular member 30. One or more spacer tubes 42 are attached to the portion 38 to assist in fixing the portion to the arm, by, for example, set screws 44 or other suitable fastening members. A spring brace 46 is also provided between the torsion spring 34 and the end 36 of the arm. The spring mechanism is typically formed of steel, although other suitable materials may be used as well. It will be appreciated that other torsion spring mechanisms can be used, if desired, as is known in the art.

The arm includes at least one and preferably two integrally formed fins 50, 52 or flanges extending longitudinally along the length of the tubular members. The tubular member and fins together form a single, unitary body. Preferably, the fins have generally rectangular cross-sections and are located 180° apart on opposite sides of the arm. In the embodiment shown, one fin is wider and shorter in cross-section than the other fin to accommodate apertures for the fastening members used to attach the arm to the spring mechanism. It will be appreciated that the particular cross-section may be chosen depending on the particular manner of mounting the arm to the pivoting mechanism and to the cover. Similarly, the number and placement of the fins about the circumference of the tubular member may be selected as desired to meet the requirements of a particular application.

The arms 26 are preferably formed of an aluminum, although other suitable materials may be used. For example, the arms may be formed of a composite material, such as a carbon fiber, fiberglass reinforced plastic, carbon—carbon, or carbon-silicon carbide composite. Preferably, the arm is formed as a single, unitary body by forming the tubular member 30 and the fins 50, 52 together as a single extrusion. Other methods that result in a single, unitary body may also be used if desired, however. For example, the arms may be molded, cast, or pultruded.

It will be appreciated that the fins do not have to extend along the entire length of the arm. The fins should extend for a sufficient distance to ensure that the arms do not bend or deform excessively during use. For example, a portion of the fins may be omitted during forming or removed after forming (by, for example, cutting the portion away) for a distance at one or both ends to accommodate an alternate manner of attaching the arms to the pivot mechanism or the cover.

For a long dump trailer, an extruded aluminum arm typically has a length of approximately 16 feet. The total deflection for an arm according to the present invention is approximately 2.5 inches measured at the end of the arm attached to the cover assembly with a static load of 50 pounds.

Figure 10:
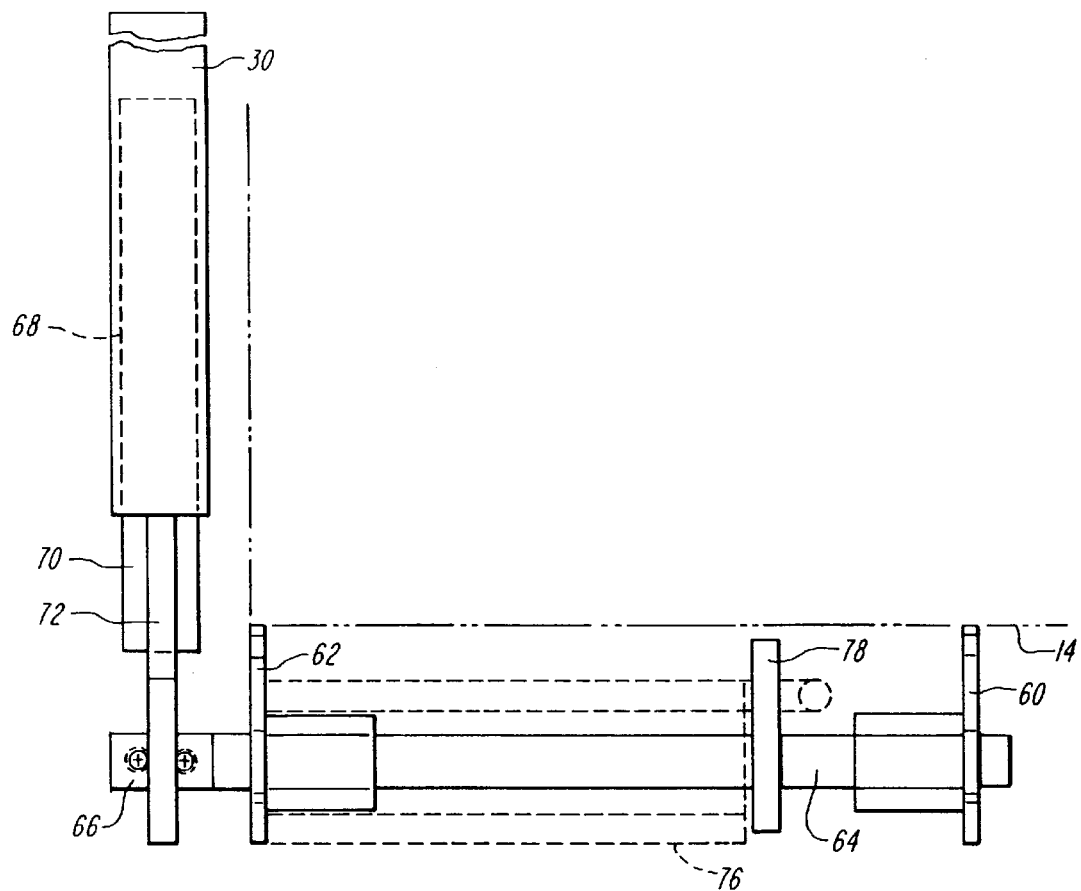
FIG. 10 is a side view of a pivot mechanism incorporating the torsion spring assembly of FIG. 8.

An alternative mounting assembly for mounting the pivot arm to the torsion spring assembly is illustrated in FIGS. 8 through 10. A pair of mounting brackets 60, 62 is fixed to the underside of the container body 14. A shaft 64 is supported for rotation by the mounting brackets. One end of the shaft extends beyond the side of the container body. At least the end portion 66 of the shaft has a square or other multi-sided cross-sectional configuration. An inner tube 68 extends within the lower portion of the tubular member 30 of the pivot arm 26 and is attached thereto in the manner described above, as with set screws or other fastening members. (In FIG. 10, the fins and fastening members are omitted for clarity.) A lower end 70 of the inner tube extends out of the pivot arm. A mounting plate 72 is fastened thereto in any suitable manner, such as by welding. The mounting plate includes an opening 74, which has a configuration complementary to that of the shaft, through which the square end portion of the shaft passer. In this manner, rotation of the shaft causes the mounting plate, the inner tube, and, consequently, the pivot arm, to rotate. Similarly, rotation of the pivot arm causes rotation of the shaft. One end of the torsion spring 76 is fixed with respect to the container body, for example, at the mounting bracket 62. The other end is fixed to the shaft 64, for example, via a lever arm 78, such that rotation of the shaft twists the torsion spring 76, and the torsion spring tends to exert an opposite restoring torque on the shaft 64.

Figure 11:
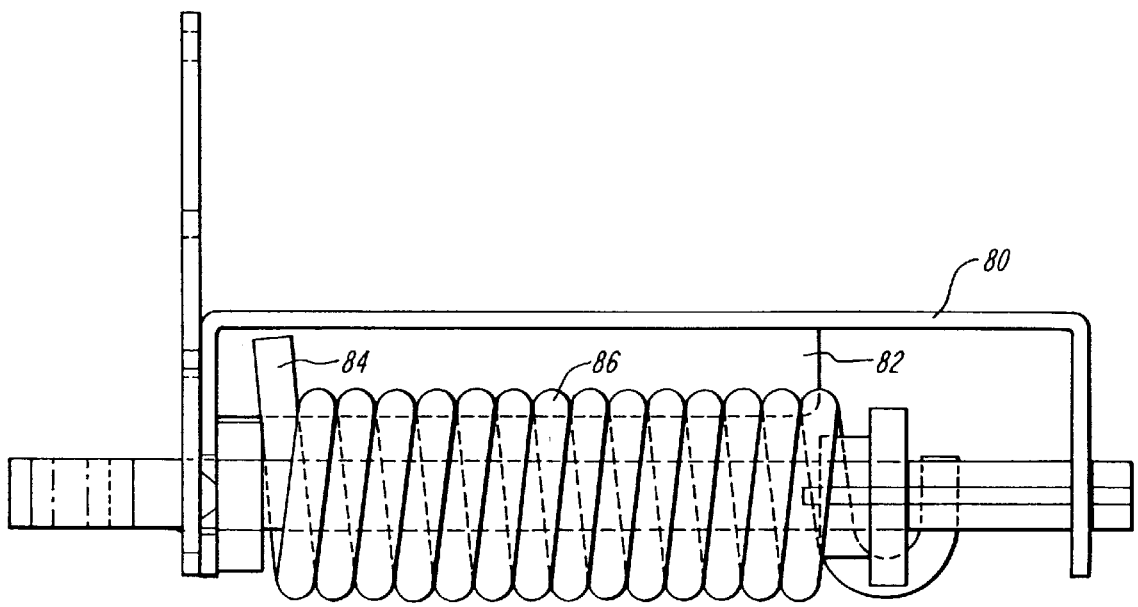
FIG. 11 is a side view of a further embodiment of a torsion spring assembly according to the present invention.

A still further embodiment of a torsion spring mechanism is illustrated in FIG. 11. In this embodiment, a mounting bracket 80 includes a plate 82 against which one end 84 of the torsion spring 86 abuts to fix the spring with respect to the container body. The spring may be mounted to the pivot arm as discussed above.

The invention is not to be limited by what has been particularly shown and described, except as indicated by the appended claims.

What is claimed is:

1. An apparatus for covering an upwardly open container body having an upper edge, the apparatus comprising:

a flexible cover of a size to substantially cover the open container body and fixed at one end of the container body by a cover support for retraction and extension over the open container body;

a pair of arms each pivotally mounted at a fixed end to the container body, and each having a free end opposite the fixed end attached to an edge of the flexible cover and configured such that movement of the arms causes movement of the cover over the open container body;

each arm further comprising a longitudinally extending, tubular member having a hollow interior and at least one stiffening fin extending longitudinally along substantially the length of the tubular member, the fin integrally formed with and attached to the tubular member, the fin and the tubular member comprising a single, unitary body; and a pivoting mechanism attached to the container body, the pivoting mechanism including a torsion spring mechanism fixed to the arm to bias the arm in a selected direction and including a portion extending into an interior of the tubular member, the tubular member fixed to the extending portion by fastening members extending through apertures in the fin, the apertures extending through the fin radially to the tubular member into the hollow interior of the tubular member.

2. The apparatus of claim 1, wherein each arm further includes a second stiffening fin extending longitudinally along substantially the length of the tubular member, the second fin integral with and attached to the tubular member and located on an opposite side of the tubular member from the at least one fin.

3. The apparatus of claim 1, wherein each arm further includes a second fin extending longitudinally along substantially the length of the tubular member, the second fin integral with and attached to the tubular member and located 180° from the at least one fin.

4. The apparatus of claim 1, wherein the arm and fin are formed of an aluminum material.

5. The apparatus of claim 1, wherein the arm and fin comprise a single extrusion.

6. The apparatus of claim 1, wherein the arm and fin comprise a single extrusion of an aluminum material.

7. The apparatus of claim 1, wherein the tubular member has a circular cross-section.

8. The apparatus of claim 1, wherein the fin has a rectangular cross-section.

* * * * *

UNITED STATES PATENT AND TRADEMARK OFFICE
CERTIFICATE OF CORRECTION

PATENT NO.    : 6,273,490 B1
DATED         : August 14, 2001
INVENTOR(S)   : Edward N. Haddad, Jr.

It is certified that error appears in the above-identified patent and that said Letters Patent is hereby corrected as shown below:

<u>Title page,</u>
Item [57], ABSTRACT,
Line 12, "tabular" should read -- tubular --; and <u>Column 3,</u>
Line 68, "passer" should read -- passes --.

Signed and Sealed this

Fourth Day of June, 2002

*Attest:*

JAMES E. ROGAN
*Attesting Officer*   *Director of the United States Patent and Trademark Office*